United States Patent
Kameyama et al.

(10) Patent No.: US 6,339,501 B1
(45) Date of Patent: Jan. 15, 2002

(54) POLARIZING MEMBER, OPTICAL MEMBER AND LIQUID-CRYSTAL DISPLAY DEVICE

(75) Inventors: Tadayuki Kameyama; Hironori Motomura, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/632,637

(22) Filed: Aug. 4, 2000

(30) Foreign Application Priority Data

Aug. 4, 1999 (JP) ............................. 11-221388

(51) Int. Cl.$^7$ .............. G02F 1/13; G02F 5/30; G02B 5/02
(52) U.S. Cl. .............. 359/485; 359/483; 359/494; 359/500; 359/599; 349/64; 349/96; 349/98; 349/194
(58) Field of Search .............. 359/599, 483, 359/485, 487, 494, 500; 349/194, 98, 96, 64; 428/333

(56) References Cited

U.S. PATENT DOCUMENTS

| | | | |
|---|---|---|---|
| 5,773,126 A | * | 6/1998 | Noritake et al. ............ 359/483 |
| 5,856,855 A | * | 1/1999 | Mol et al. .................... 349/194 |
| 5,909,314 A | * | 6/1999 | Oka et al. ................... 359/582 |
| 5,925,438 A | * | 7/1999 | Ota et al. .................... 428/331 |
| 5,998,013 A | * | 12/1999 | Shoshi et al. ............... 428/331 |
| 6,111,699 A | * | 8/2000 | Iwata et al. ................. 359/599 |
| 6,111,700 A | * | 8/2000 | Kobayashi et al. ......... 349/194 |
| 6,261,665 B1 | * | 7/2001 | Murata et al. .............. 428/323 |

FOREIGN PATENT DOCUMENTS

| | | | |
|---|---|---|---|
| JP | 06-94904 A | * | 4/1994 |
| JP | 06-123802 A | * | 5/1994 |
| JP | 2000-75136 A | * | 3/2000 |
| JP | 2000-162438 A | * | 6/2000 |
| JP | 2000-162440 A | * | 6/2000 |

* cited by examiner

*Primary Examiner*—Cassandra Spyrou
*Assistant Examiner*—John Juba, Jr.
(74) *Attorney, Agent, or Firm*—Sughrue Mion, PLLC

(57) ABSTRACT

A polarizing member has a reflection type polarizing plate capable of separating natural incident light into reflected light and transmitted light to thereby obtain polarized transmitted light, and a fine concave-convex structure disposed on a single surface of the reflection type polarizing plate. The fine concave-convex structure has a center-line average roughness Ra of from 0.01 to 0.1 μm, ten or more convex portions with a height of from 0.5 to 1.0 μm, and two or less convex portions with a height larger than 1.0 μm on any 1 mm-long line segment, and the fine concave-convex structure has a surface hardness of from H to 4H in terms of pencil hardness.

9 Claims, 1 Drawing Sheet

POLARIZING MEMBER, OPTICAL MEMBER AND LIQUID-CRYSTAL DISPLAY DEVICE

BACKGROUND OF THE INVENTION

1. Field of the Invention

The present invention relates to a polarizing member and an optical member, in which sticking can be prevented while an adjacent optical sheet can be prevented from being injured, and which are adapted for formation of a liquid-crystal display device, or the like.

The present application is based on Japanese Patent Application No. Hei. 11-221388, which is incorporated herein by reference.

2. Description of the Related Art

Further reduction in thickness, increase in size and improvement in luminance are required in a liquid-crystal display device. If a side-light type light pipe for forming a back-lighting device is made thin or large-sized for the purpose of reduction of thickness or increase of size, lowering of luminance may be however caused. Therefore, a measure to improve light-utilizing efficiency to thereby improve luminance is taken as the following method. That is, a prism sheet and a reflection type polarizing plate are disposed on a back-lighting device so that outgoing light from the back-lighting device is imported into the reflection type polarizing plate while the optical path of the light is controlled by the prism sheet. The outgoing light is converted into polarized light by the reflection type polarizing plate, so that the polarized light is supplied to an absorption type polarizing plate. In this case, reduction of thickness can be achieved when the reflection type polarizing plate and the absorption type polarizing plate are laminated and integrated with each other to eliminate interposition of space.

However, if the reflection type polarizing plate is disposed on the prism sheet, interference fringes appear or the reflection type polarizing plate and the prism sheet stick to each other to thereby cause a sticking phenomenon. Hence, there is a problem that display quality is lowered. If an anti-glare layer for preventing glaring light is provided on the visual side to prevent sticking, the prism sheet is injured or damaged by the concave-convex structure of the anti-glare layer. Hence, there is a problem that the injury or damage of the prism sheet formed a scattering point, or the like, to disturb the optical function to thereby cause extreme lowering of the display quality.

SUMMARY OF THE INVENTION

An object of the present invention is to develop a reflection type polarizing plate which can prevent a prism sheet adjacent to the polarizing plate from causing interference fringes and from being injured, and which can prevent the adjacent prism sheet from sticking to the polarizing plate even in the case where the prism sheet is disposed adjacently to the polarizing plate for the purposes of reducing the thickness of a liquid-crystal display device, increasing the size of the same, and improving the luminance of the same.

According to the present invention, there is provided a polarizing member which has a reflection type polarizing plate capable of separating natural incident light into reflected light and transmitted light to thereby obtain polarized transmitted light, and a fine concave-convex structure disposed on a single surface of the reflection type polarizing plate, wherein: the fine concave-convex structure has a center-line average roughness Ra of from 0.011 to 0.1 $\mu$m; the fine concave-convex structure has ten or more convex portions with a height of from 0.5 to 1.0 $\mu$m and two or less convex portions with a height larger than 1.0 $\mu$m on any 1 mm-long line segment; and the fine concave-convex structure has a surface hardness of from H to 4H in terms of pencil hardness.

According to the present invention, on the basis of the fine concave-convex structure which is fine and has a moderate surface hardness, sticking to an adjacent optical sheet can be prevented and the adjacent optical sheet can be prevented from being injured. Moreover, the diffusing effect of the fine concave-convex structure can prevent interference fringes from occurring even in the case where the fine concave-convex structure is adjacent to the prism sheet. As a result, a large-area liquid-crystal display device which is thin, excellent in luminance and excellent in display quality, or the like, can be formed.

Features and advantages of the invention will be evident from the following detailed description of the preferred embodiments described in conjunction with the attached drawings.

DETAILED DESCRIPTION OF THE PREFERRED EMBODIMENTS

Figure 1:
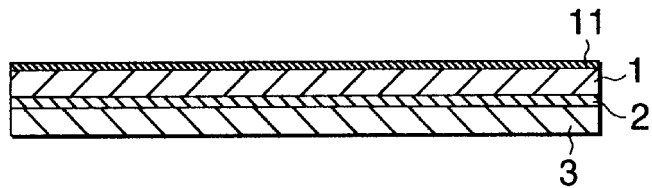
FIG. 1 is a sectional view of an optical member.
Figure 2:
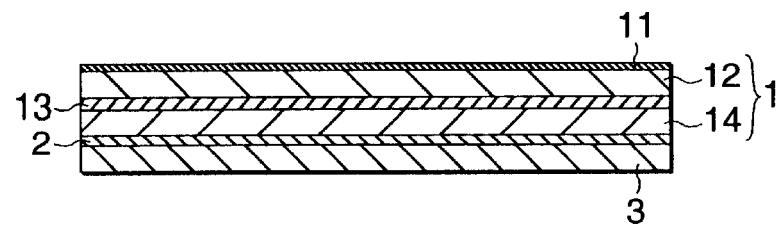
FIG. 2 is a sectional view of another optical member.

A polarizing member according to the present invention is constituted by a reflection type polarizing plate capable of separating natural incident light into reflected light and transmitted light to obtain polarized transmitted light, and a fine concave-convex structure disposed on a single surface of the reflection type polarizing plate. The fine concave-convex structure has a center-line average roughness Ra of from 0.01 to 0.1 $\mu$m, the fine concave-convex structure has ten or more convex portions with a height of from 0.5 to 1.0 $\mu$m and two or less convex portions with a height larger than 1.0 $\mu$m on any 1 mm-long line segment, and the fine concave-convex structure has a surface hardness of from H to 4H in terms of pencil hardness. FIGS. 1 and 2 show examples of the polarizing member. In the drawings, the reference numeral 1 designates a reflection type polarizing plate; and 11, a fine concave-convex structure.

A suitable material capable of separating natural incident light into reflected light and transmitted light to obtain polarized transmitted light can be used as the reflection type polarizing plate having a single surface to be covered with the fine concave-convex structure. The material is not particularly limited in kind. Incidentally, examples of the material may include materials exhibiting characteristic of transmitting one of left and right circularly polarized light parts and reflecting the other circularly polarized light part, and materials exhibiting characteristic of transmitting light linearly polarized on a predetermined axis of polarization but reflecting the other light. The former materials are an oritented film of a cholesteric liquid crystal layer, especially, of a cholesteric liquid crystal polymer, a material having the oriented liquid crystal layer supported on a film substrate, etc. The latter materials are a dielectric multilayer thin film, a multilayer laminate of thin films different in refractive index and anisotropy, etc.

Hence, the aforementioned reflection type polarizing plate may be referred to as "polarization separating plate", or the like. Light from a light source such as a back-lighting device is made to be incident on the reflection type polarizing plate, so that transmitted light in a predetermined polarized state is obtained by the reflection type polarizing plate. Moreover, reflected light is inverted through a reflection layer, or the like, and made to be incident on the reflection type polarizing plate again. Hence, the reflection type polarizing plate transmits part or all of the reflected light as light in a predetermined polarized state to thereby increase the quantity of light transmitted through the reflection type polarizing plate. Moreover, polarized light hard to be absorbed to an absorption type polarizing plate is supplied to thereby increase the quantity of light allowed to be utilized for liquid-crystal display, or the like. As a result, the reflection type polarizing plate can improve luminance.

With respect to the reflection type polarizing plate of the type of transmitting light linearly polarized on the predetermined axis of polarization, when light transmitted through the reflection type polarizing plate is made to be directly incident on an absorption type polarizing plate while the axis of polarization is made uniform, the absorption type polarizing plate can transmit the light efficiently while absorption loss due to the absorption type polarizing plate is suppressed. With respect to the reflection type polarizing plate of the linearly polarized light transmission type, there is no limitation in a surface on which the fine concave-convex structure is arranged.

On the other hand, in the reflection type polarizing plate 12 of the type of transmitting circularly polarized light as represented by a cholesteric liquid crystal layer as shown in FIG. 2, circularly polarized light transmitted through the reflection type polarizing plate may be made to be directly incident on an absorption type polarizing plate. It is, however, preferable from the point of view of suppression of absorption loss that the circularly polarized light is linearly polarized through a retarder plate constituted by a quarter-wave plate 14, etc. before the light is made to be incident on the absorption type polarizing plate. In this case, the fine concave-convex structure is formed on a side of the reflection type polarizing plate in which the quarter-wave plate is not provided. Incidentally, in FIG. 2, the reference numeral 13 designates an adhesive layer.

The retarder plate serves as a quarter-wave plate in a wide wavelength range such as a visible light range. For example, the retarder plate can be obtained by a method in which a phase-difference layer serving as a quarter-wave plate for monochromatic light such as light having a wavelength of 550 nm is superposed on a phase-difference layer exhibiting the other phase-difference characteristic such as a phase-difference layer serving as a half-wave plate. Hence, the retarder plate provided in the reflection type polarizing plate of the circularly polarized light transmission type may be constituted by one phase-difference layer or by a plurality of phase-difference layers.

The cholesteric liquid crystal layer may be also provided as a multilayer structure in which a plurality of cholesteric liquid crystal layers different in reflection wavelength are used in combination and superposed on one another. In this case, the cholesteric liquid crystal layer can be obtained as a layer reflecting circularly polarized light in a wide wavelength range such as a visible light range. Hence, transmitted light of the circularly polarized light in a wide wavelength range can be obtained. Incidentally, when an absorption type polarizing plate 3 is used in combination with the reflection type polarizing plate 12 having the quarter-wave plate 14, etc. as shown in FIG. 2, the absorption type polarizing plate 12 is disposed on the quarter-wave plate side of the reflection type polarizing plate 12.

The fine concave-convex structure 11 provided on a single surface of the reflection type polarizing plate 1 as shown in the drawings has a center-line average roughness Ra of from 0.01 to 0.1 $\mu$m. The fine concave-convex structure 11 has ten or more convex portions with a height of from 0.5 to 1.0 $\mu$m and two or less convex portions with a height larger than 1.0 $\mu$m on any 1 mm-long line segment. The fine concave-convex structure 11 has a surface hardness of from H to 4H in terms of pencil hardness.

If the center-line average roughness Ra is lower than 0.01 $\mu$m, sticking cannot be prevented. If Ra is higher than 0.1 $\mu$m, injury occurs in an adjacent optical sheet. If the number of convex portions each having a height of from 0.5 to 1.0 $\mu$m and located on any 1 mm-long line segment is smaller than ten when the line segment is provided on a surface of the fine concave-convex structure, sticking cannot be prevented. If the number of convex portions each having a height larger than 1.0 $\mu$m and located on the 1 mm-long line segment is larger than two, injury occurs in the adjacent optical sheet.

Figure 3:
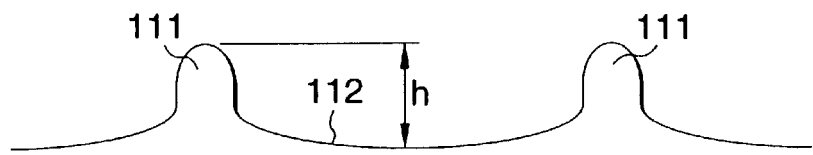
FIG. 3 is a view for explaining the height of a convex portion.

If the surface hardness is lower than H in terms of pencil hardness, injury is opt to occur in the fine concave-convex structure side so that handling property in working is lowered. If the surface hardness is higher than 4H, injury occurs in the adjacent optical sheet. Incidentally, as shown in FIG. 3, the height h is based on the distance between the top of a convex portion 111 in a surface 112 of the fine concave-convex structure and the bottom between the convex portion 111 and an adjacent convex portion.

The fine concave-convex structure preferred from the point of balance between prevention of injury and prevention of sticking and prevention of the occurrence of interference fringes in the case of adjacently arrangement of a prism sheet is provided as a structure in which: the center-line average roughness Ra is not lower than 0.02 $\mu$m, especially not lower than 0.03 $\mu$m, more especially in a range of from 0.04 to 0.09 $\mu$m; the number of convex portions each having a height of from 0.5 to 1.0 $\mu$m and located on any 1 mm-long line segment is not smaller than 50, especially not smaller than 100, more especially not smaller than 150; the number of convex portions each having a height larger than 1.0 $\mu$m and located on the line segment is not larger than 1, especially zero; and the surface hardness is in a range of from 2H to 3H in terms of pencil hardness.

The fine concave-convex structure in the reflection type polarizing plate may be formed by any suitable method if it has the aforementioned characteristic. Incidentally, examples of the fine concave-convex structure may include a fine concave-convex structure given to a surface by a suitable surface roughening method such as sandblasting, emboss rolling, chemical etching, or the like, a fine concave-convex structure given to a surface by a decalcomania transferring method using a mold, a resin layer dispersively containing fine particles, and so on.

Hence, for example, the fine concave-convex structure can be formed as a fine concave-convex structure given to a surface of the reflection type polarizing plate by treating the surface or as a layer added to a surface of the reflection type polarizing plate by application of the aforementioned resin layer onto the surface. The fine concave-convex structure may be formed as a composite layer constituted by two or more kinds of layers as described above.

A fine concave-convex structure made from a resin layer containing fine particles by application of the resin layer onto a single surface of the reflection type polarizing plate is preferred from the point of view of the formability of the aforementioned concave-convex characteristic, or the like. The resin layer can be formed by a suitable method. Examples of the method may include a method in which a resin solution dispersively containing fine particles is applied onto the reflection type polarizing plate by a suitable method such as a doctor blade method or a gravure roll coating method to thereby form a coating film, a method in which a resin film containing fine particles is formed in advance so that the resin film is adhesively bonded onto the reflection type polarizing plate, and so on.

Incidentally, the resin used for forming the resin layer is not particularly limited. A suitable resin may be used in accordance with the hardness or the like of the resin layer. Examples of the resin may include polyester polymers such as polyethylene terephthalate and polyethylene naphthalate; cellulose polymers such as cellulose diacetate and cellulose triacetate; polycarbonate polymers; acrylic polymers such as polymethyl methacrylate; styrene polymers such as polystyrene and acrylonitrile/styrene copolymer, and so on.

Examples of the resin may further include olefin polymers such as polyethylene, polypropylene, olefin having a cyclo or norbornene structure and ethylene/propylene copolymer; vinyl chloride polymers; and amide polymers such as Nylon and aromatic polyamide.

Examples of the resin may further include imide polymers, sulfone polymers, polyether sulfone polymers, polyether-ether-ketone polymers, polyphenylene sulfide polymers, vinyl alcohol polymers, vinylidene chloride polymers, vinyl butyral polymers, allylatepolymers, polyoxymethylene polymers, epoxy polymers, and blends of the aforementioned polymers.

The resin preferably used for forming the fine concave-convex structure may be an ultraviolet-curable resin. When the ultraviolet-curable resin is used, a layer constituted by an ultraviolet-curable resin layer containing fine particles as occasion demands can be formed efficiently by a simple operation of curing the coating layer by ultraviolet-ray irradiation. Moreover, it can be also easily performed that an ultraviolet-curable resin layer is formed on a roughened surface so that the surface unevenness of the reflection type polarizing plate is reflected on the surface of the ultraviolet-curable resin.

A suitable resin in which monomer, oligomer or unsaturated polymer capable of forming a resin such as a polyester resin, an acrylic resin, an urethane resin, an amide resin, a silicone resin or an epoxy resin is mixed with an ultraviolet-polymerization initiator so that a resin layer can be cured by ultraviolet irradiation can be used as the ultraviolet-curable resin.

The ultraviolet-curable resin to be preferably used is a resin which is excellent in adhesion to a surface of the reflection type polarizing plate as a subject of the provision of the resin, excellent in transparency and hard coating characteristic, excellent in dispersibility of fine particles contained in the resin and excellent in satisfaction of the aforementioned hardness of the cured coating film. For example, the ultraviolet-curable resin to be preferably used may include acrylic monomer or oligomer having ultraviolet-polymerizable functional groups, especially two or more ultraviolet-polymerizable functional groups, more especially from three to six ultraviolet-polymerizable functional groups.

Examples of the fine particles to be preferably used may include crosslinked or non-crosslinked organic particles of various polymers such as polymethyl methacrylate, polyurethane, polystyrene and melamine resin, and inorganic particles of silica, alumina, titania, zirconia, calcium oxide, tin oxide, indium oxide, cadmium oxide, antimony oxide, etc. The inorganic particles may be electrically conductive.

Spherical particles are used preferably as the fine particles from the point of view of facilitation of the aforementioned concave-convex characteristic, prevention of the formation of acute convex portions, etc. Especially, organic spherical particles hard to be dissolved in the resin before curing are used preferably. Fine particles having a mean particle size of from 0.1 to 10 $\mu$m, especially from 0.5 to 5 $\mu$m, more especially from 1 to 4 $\mu$m, are used preferably from the point of view of excellent balance between prevention of injury and prevention of sticking, etc.

It is particularly preferable that the curvature radius of each convex portion in the fine concave-convex structure is in a range of from 0.01 to 3 $\mu$m, especially in a range of from 0.05 to 1.5 $\mu$m, more especially in a range of from 0.1 to 1.0 $\mu$m, from the point of view in which balance between prevention of sticking and prevention of glaring light due to interference with the liquid-crystal cell is kept good while smooth convex portions prevent injury.

The polarizing member according to the present invention may be used for various purposes in accordance with the background-art purposes. Particularly when an optical sheet such as a prism sheet is disposed to be adjacent to the reflection type polarizing plate as represented by a liquid-crystal display device, the polarizing member according to the present invention can be used for the purpose that the adjacent optical sheet is prevented from sticking to the polarizing member while the optical sheet is prevented from being injured, the purpose that interference fringes are prevented from occurring due to interference between the polarizing member and the optical sheet, and so on.

When the polarizing member is put into practical use, the polarizing member may be used in combination with an absorption type polarizing plate 3 as shown in FIGS. 1 and 2 so that a laminate of the polarizing member and the absorption type polarizing plate 3 serves as an optical member. Particularly when the polarizing member is applied to a liquid-crystal display device, such an optical member can be used for the purpose of improving reduction of thickness and assembling efficiency, etc. In this case, the absorption type polarizing member 3 is disposed on a side of the reflection type polarizing plate 1 opposite to the fine concave-convex structure 11 as shown in FIGS. 1 and 2. Incidentally, the reference numeral 2 designates an adhesive layer.

With respect to the arrangement of the absorption type polarizing plate, it is preferable from the point of view of light utilizing efficiency, that is, improvement of luminance that the absorption type polarizing plate is disposed so as to exhibit the maximum transmission factor to light transmitted through the polarizing member (reflection type polarizing plate). Such arrangement of the absorption type polarizing plate can be achieved when the axis of polarization (the plane of vibration) of linearly polarized light transmitted through the polarizing member is made as coincident with the axis of transmission of the absorption type polarizing plate as possible. Incidentally, variations in the positional relation between the axes due to working error, etc. are permitted.

A suitable material may be used as the absorption type polarizing plate so long as the material can transmit light linearly polarized on a predetermined axis of polarization and absorb the other light. The material is not particularly limited in kind. Incidentally, examples of the material may include a polarizing film obtained by stretching after adsorption of iodine and/or dichromatic dye onto a hydrophilic high-molecular film such as a polyvinyl alcohol film, a partially formalized polyvinyl alcohol film or a partially saponified ethylene/vinyl acetate copolymer film, a polyene-oriented polarizing film of dehydrated polyvinyl alcohol or dehydrochlorinated vinyl chloride, and so on.

The absorption type polarizing plate may contain a transparent protective layer provided on a single surface of the polarizing film or may contain transparent protective layers provided on both surfaces of the polarizing film. Such a transparent protective layer is provided for the purpose of protection such as improvement of water resistance, reinforcement, etc. A polymer excellent in transparency, mechanical strength, heat stability, water shielding characteristic, and so on, is preferably used for the formation of the transparent protective layer. Incidentally, examples of the polymer are resins described above in the fine concave-convex structure. The transparent protective layer can be formed by a suitable method such as a method of applying a polymer solution, a method of adhesively bonding polymer films to be laminated, and so on. The thickness of the transparent protective layer is not limited but generally set to be not larger than 500 μm, especially in a range of from 1 to 300 μm, more especially in a range of from 5 to 200 μm.

An adhesive layer 2 as shown in FIGS. 1 and 2 can be used for the lamination of the polarizing member and the absorption type polarizing plate as occasion demands. The adhesive layer can be made from a suitable adhesive agent such as a tacky material or tackifier containing a suitable polymer such as acrylic polymer, silicone polymer, polyester, polyurethane, polyether, synthetic rubber, or the like, as a base polymer, or a hot-melt adhesive agent. Especially, an adhesive agent such as an acrylic tackifier excellent in optical transparency and excellent in weather resistance, heat resistance, and so on, is preferably used because it is possible to avoid a peel problem such as rising, peeling, or the like, under the high-temperature and high-humidity condition.

Incidentally, an example of the acrylic tackifier may be a tackifier containing an acrylic polymer, as a base polymer, which has a weight average molecular weight of not lower than 100000 and which is obtained by copolymerization using (meth)acrylic alkyl ester containing an alkyl group, such as a methyl group, an ethyl group, a butyl group, or the like, having 20 or less carbon atoms in combination with acrylic monomer such as (meth)acrylic acid, hydroxyethyl (meth) acrylate, or the like, as a modifying component so that the glass transition temperature is made to be not higher than 0° C. The acrylic tackifier is not limited to this example. Incidentally, the adhesive layer can be used for adhesively bonding the reflection type polarizing plate to the quarter-wave plate, or the like.

The provision of such an adhesive or tacky layer onto the polarizing member or/and the absorption type polarizing plate or onto the reflection type polarizing plate or/and the quarter-wave plate, etc., can be performed by a suitable method such as a method of directly providing an adhesive or tackifier solution onto the polarizing member, or the like, by a suitable expanding method such as a casting method, a coating method, or the like, or a method of forming a tacky layer on a separator in accordance with the aforementioned method and transferring the tacky layer onto the polarizing member, or the like.

The thickness of the adhesive layer can be determined suitably in accordance with the adhesive force, or the like. The thickness of the adhesive layer is generally set to be in a range of from 1 to 500 μm. Such an adhesive layer may be also provided on a predetermined outer surface of the polarizing member or optical member in order to bond the polarizing member or optical member to another member such as a liquid-crystal cell as occasion demands. The adhesive layer may be mixed with fine particles so as to be provided as a light-diffusing type as occasion demands. Incidentally, when the adhesive layer is constituted by a tacky layer exposed, it is preferable that the exposed surface of the tacky layer is temporarily covered with a separator, or the like, for the purpose of protection such as prevention of contamination until the tacky layer is put into practical use.

Figure 4:
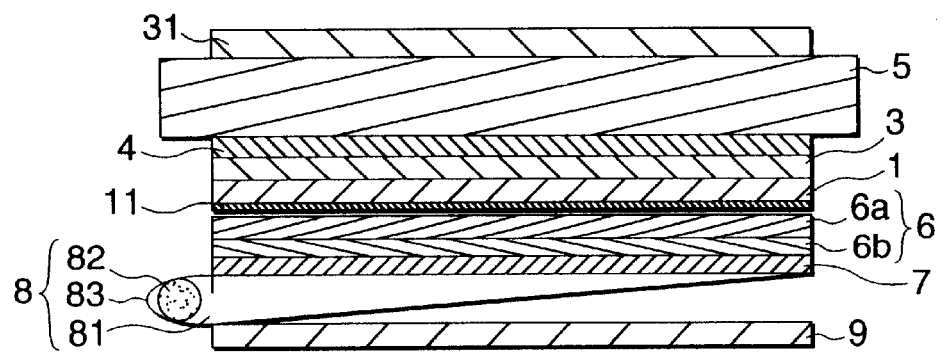
FIG. 4 is a sectional view of a liquid-crystal display device.

In the liquid-crystal display device according to the present invention, a polarizing member or optical member is disposed on a surface light source side of a liquid-crystal cell. FIG. 4 shows an example of the liquid-crystal display device. That is, a liquid-crystal cell 5 adhering to an absorption type polarizing plate 31 on the visual side and adhering to an optical member constituted by a laminate of a polarizing member 1, an absorption type polarizing plate 3 and a retarder plate 4 on the back side opposite to the visual side is disposed on a surface light source (back-lighting device) 8 through a light-diffusing sheet 7 and a light-condensing sheet 6.

As shown in FIG. 4, the liquid-crystal display device is formed so that the fine concave-convex structure surface 11 of the polarizing member 1 is disposed on the surface light source 8 side. That is, the fine concave-convex structure surface 11 of the polarizing member 1 is disposed so as to be adjacent to the uppermost optical sheet disposed on the surface light source 8. Hence, in FIG. 4, the fine concave-convex structure surface 11 of the polarizing member 1 is disposed so as to be adjacent to a prism sheet 6a which is a constituent member of the light-condensing sheet 6. At least the fine concave-convex structure of the polarizing member and the optical sheet adjacent to the fine concave-convex structure are generally provided without the provision of any adhesive layer. That is, the fine concave-convex structure is merely placed on the adjacent optical sheet in order to prevent both sticking and injury.

Incidentally, the surface light source 8 shown in FIG. 4 is of a side-light type in which a reflection layer 9 is provided under a bottom surface of a light pipe 81 provided with a light source 82 enclosed in a holder 83 disposed on a side face of the light pipe 81. The light-condensing sheet 6 above the surface light source 8 has prism sheets 6a and 6b which are disposed so that the prism ridgelines of the prism sheets 6a and 6b cross each other. The absorption type polarizing plate 31 on the visual side has an anti-glare layer in its outer surface.

According to the liquid-crystal display device, light emitted from the surface light source 8 is diffused by the light-diffusing sheet 7 and the optical path of the light is controlled by the light-condensing sheet 6. As a result, the light is incident on the reflection type polarizing plate (polarizing member) 1 through the fine concave-convex structure 11. The light is separated into reflected light and transmitted light by the polarizing member 1. The polarized light transmitted through the polarizing member 1 passes through the absorption type polarizing plate 3 with low absorption loss so as to be incident on the liquid-crystal cell 5 through the retarder plate 4. The light finally exits as display light from the absorption type polarizing plate 31 on the visual side. On this occasion, the luminance of the liquid-crystal display device can be improved by reduction of absorption loss due to the absorption type polarizing plate 3 and by improvement of light-utilizing efficiency using light reflected by the reflection type polarizing plate 1 so that the reflected light is inverted by the reflection layer 9 on the lower surface side of the liquid guide plate 81 so as to be incident on the reflection type polarizing plate 1 and transmitted through the reflection type polarizing plate 1 again.

Although FIG. 4 shows the case where the light-condensing sheet is provided as an optical sheet adjacent to the fine concave-convex structure of the reflection type polarizing plate, the present invention is not limited thereto. The optical sheet adjacent to the reflection type polarizing plate, inclusive of the absorption type polarizing plate oppositely adjacent to the reflection type polarizing plate, may be selected suitably in accordance with the form of the liquid-crystal display device, or the like, which is an object of formation. Hence, besides the light-diffusing sheet, the light-condensing sheet and the absorption type polarizing plate, one kind of suitable optical sheet or two or more kinds of suitable optical sheets to be used for the formation of the liquid-crystal display device may be used as the optical sheet.

The retarder plate 4 provided on the light transmission side of the absorption type polarizing plate 3 as shown in FIG. 4 is disposed for the purpose of improvement of visibility based on compensation for phase difference due to the liquid-crystal cell as occasion demands. The retarder plate 4 may be integrated with the polarizing member as a part of the optical member or may be provided separately from the polarizing member or optical member.

The optically compensating retarder plate may be formed in the same manner as the quarter-wave plate, or the like. That is, a suitable material such as a birefringent film made of a stretched film of any kind of polymer, an oriented film of liquid-crystal polymer such as discotic or nematic liquid-crystal polymer, or a material obtained by supporting the oriented liquid-crystal layer on a film substrate, in accordance with the background art may be used as the optically compensating retarder plate. In the case where the oriented liquid-crystal layer is supported on a film substrate, it is preferable to use, as the film substrate, a substrate which is excellent in isotropy, such as a cellulose one.

The same suitable material as exemplified in the resin layer for forming the fine concave-convex structure may be used as the polymer for forming the birefringent film. Especially, polymers excellent in crystallinity, such as polyester polymers and polyether-ether-ketone polymers, can be used preferably. The stretched film may be a film treated by a suitable method such as one-way stretching, two-way stretching, or the like. The film may be a birefringent film in which the refractive index in the direction of the thickness of the film is controlled by a method of giving contracting force or/and stretching force under adhesion to a heat-shrinkable film. The optically compensating retarder plate may be also provided as a laminate of two or more phase-difference layers to control optical characteristic such as phase difference.

As described above, the polarizing member according to the present invention may be laminated with one suitable optical layer or two or more suitable optical layers such as an absorption type polarizing plate, and so on, so that the relating laminate is put into practical use as an optical member as occasion demands. For the formation of the liquid-crystal display device, the polarizing member is disposed on a side of the liquid-crystal cell on which illumination light from the surface light source, or the like, is incident. The liquid-crystal display device is not particularly limited except that the polarizing member or optical member according to the present invention is used. The liquid-crystal display device can be formed in accordance with the background-art method.

Hence, any optional liquid-crystal cell can be used for the formation of the liquid-crystal display device. For example, various liquid-crystal display devices can be formed by use of suitable types of liquid-crystal cells such as an active matrix drive type liquid-crystal cell represented by a thin-film transistor type liquid-crystal cell, a simple matrix drive type liquid-crystal cell represented by a TN type liquid-crystal cell or by an STN type liquid-crystal cell, a liquid-crystal cell provided with a color filter, and so on. For example, the liquid-crystal display device can be provided as a liquid-crystal display device in which one layer of suitable parts such as a prism sheet, a lens sheet, a light-diffusing plate, a back-lighting device, etc. is disposed in a suitable position or two or more layers of the suitable parts are disposed in suitable positions.

EXAMPLE 1

Cholesteric liquid-crystal polymers were applied and superposed onto a cellulose triacetate film (TD-80U made by Fuji Photo Film Co., Ltd.) through a rubbing oriented film and oriented to thereby form a reflection type polarizing plate having a structure of four layers with reflection center wavelengths of 760 nm, 650 nm, 550 nm and 430 nm. A quarter-wave plate in which Nz was −1.5 was bonded onto a single surface of the reflection type polarizing plate through an acrylic tacky layer. Nz was defined by the formula: $(nx-nz)/(nx-ny)$ in which nx, ny and nz were main refractive indices in in-plane directions and in a direction of the thickness of the quarter-wave plate respectively. An absorption type polarizing plate (SEG1425DU made by Nitto Denko Corporation) was further bonded onto the quarter-wave plate through an acrylic tacky layer. Thus, a laminate was obtained.

100 parts (parts by weight, the same rule applies hereinafter) of an urethane acrylate ultraviolet-curable resin, 20 parts of spherical resin particles having a mean particle size of 2 $\mu$m and 3 parts of an ultraviolet-polymerization initiator were mixed through a solvent by a mixer to thereby prepare a fluid dispersion containing 45% by weight of solid content. The fluid dispersion was applied onto the exposed surface of the reflection type polarizing plate in the aforementioned laminate by a bar coater. After dried, the fluid dispersion was cured through ultraviolet rays. Thus, an optical member having a surface fine concave-convex structure was obtained. The center-line average roughness Ra of the surface fine concave-convex structure was 0.07 $\mu$m. The number of convex portions each having a height of from 0.5 to 1.0 $\mu$m and located on any 1 mm-long line segment in the surface fine concave-convex structure was 200. The number of convex portions having a height larger than 1.0 $\mu$m and located on the 1 mm-long line segment in the surface fine concave-convex structure was zero. The surface hardness of the surface fine concave-convex structure was 3H in terms of pencil hardness.

EXAMPLE 2

An optical member was obtained in the same manner as in Example 1 except that DBEF (made by Sumitomo 3M Co., Ltd.) was used as the reflection type polarizing plate while the quarter-wave plate and the tacky layer to be used for the quarter-wave plate were omitted.

COMPARATIVE EXAMPLE 1

An optical member having a fine concave-convex structure as a surface was obtained in the same manner as that in Example 1 except that the spherical resin particles were replaced by 50 parts of spherical silica particles having a mean particle size of 2 μm. The center-line average roughness Ra of the fine concave-convex structure in the optical member was 0.5 μm. The number of convex portions each having a height of from 0.5 to 1.0 μm and located on any 1 mm-long line segment in the fine concave-convex structure was 450. The number of convex portions having a height larger than 1.0 μm and located on the 1 mm-long line segment in the fine concave-convex structure was 12. The surface hardness of the fine concave-convex structure was 3H in terms of pencil hardness.

COMPARATIVE EXAMPLE 2

An optical member having a fine concave-convex structure as a surface was obtained in the same manner as that in Example 1 except that the amount of the spherical resin particles to be used was set to be 0.01 parts. The center-line average roughness Ra of the fine concave-convex structure in the optical member was 0.01 μm. The number of convex portions each having a height of from 0.5 to 1.0 m and located on any 1 mm-long line segment in the fine concave-convex structure was zero. The number of convex portions having a height larger than 1.0 μm and located on the 1 mm-long line segment in the fine concave-convex structure was zero. The surface hardness of the surface fine concave-convex structure was 3H in terms of pencil hardness.

COMPARATIVE EXAMPLE 3

An optical member having a smooth surface was obtained in the same manner as in Example 1 except that spherical resin particles having a mean particle size of 8 μm were used. The center-line average roughness Ra of the smooth surface in the optical member was not higher than 0.3 μm. The number of convex portions each having a height of from 0.5 to 1.0 μm and located on any 1 mm-long line segment in the smooth surface was 30. The number of convex portions having a height larger than 1.0 μm and located on the 1 mm-long line segment in the smooth surface was 8. The surface hardness of the smooth surface was 3H in terms of pencil hardness.

Evaluation Test

Each of the optical members obtained in Examples and Comparative Examples was bonded to the back side opposite to the visual side of a liquid-crystal cell through an acrylic tacky layer so that the fine concave-convex structure of the optical member was provided as an outer surface. The resulting liquid-crystal cell was placed, through a light-diffusing sheet and a prism sheet, on a surface light source made of a side-light type light pipe through the back side. Thus, a liquid-crystal display device (FIG. 4) was formed. The liquid-crystal display device was subjected to a durability test in which the liquid-crystal display device was left for 240 hours in an initial state in an atmosphere of 60° C. and 90% RH. After the durability test, the liquid-crystal display device was subjected to a vibration test in which vibration in accordance with the vibration at the time of actually carrying or using the liquid-crystal display device was applied to the liquid-crystal display device for 1 hour. After the vibration test, the display quality caused by the presence/absence of glaring light or interference fringes, the presence/absence of sticking (ST) and the presence/absence of injury of the prism sheet surface by taking the liquid-crystal display device into parts were examined.

The aforementioned results are shown in the following Table.

|  | Example 1 | Example 2 | Comparative Example 1 | Comparative Example 2 | Comparative Example 3 |
|---|---|---|---|---|---|
| Initial State |  |  |  |  |  |
| Display Quality | Good | Good | Good | Good | Glare |
| ST | None | None | None | None | None |
| Injury | None | None | None | None | None |
| After Durability Test |  |  |  |  |  |
| Display Quality | Good | Good | Good | Bad | Glare |
| ST | None | None | None | Present | None |
| Injury | None | None | None | None | None |
| After Vibration Test |  |  |  |  |  |
| Display Quality | Good | Good | Bad | Good | Glare |
| ST | None | None | None | None | None |
| Injury | None | None | Present | None | Present |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polarizing member comprising:

a reflection type polarizing plate for separating natural incident light into reflected light and transmitted light to thereby obtain polarized transmitted light; and a fine concave-convex structure formed on a surface of said reflection type polarizing plate, wherein said fine concave-convex structure has (i) a center-line average roughness Ra of from 0.01 to 0.1 μm, (ii) ten or more convex portions with a height of from 0.5 to 1.0 μm and two or less convex portions with a height larger than 1.0 μm on a 1 mm-long line segment drawn thereon, and (iii) a surface hardness of from H to 4H in terms of pencil hardness.

2. A polarizing member according to claim 1, wherein said fine concave-convex structure contains spherical particles with a mean particle size of from 0.5 to 5 μm.

3. A polarizing member according to claim 1, wherein said reflection type polarizing plate includes a cholesteric liquid crystal layer and a quarter-wave plate.

4. A polarizing member according to claim 1, wherein said reflection type polarizing plate transmits light linearly polarized on a predetermined axis of polarization but reflects the rest light.

5. An optical member comprising: a polarizing member defined in any one of claim 1 through 4; and an absorption type polarizing plate disposed on a surface of said polarizing member opposite to said fine concave-convex structure of said polarizing member.

6. An optical member according to claim 5, wherein said absorption type polarizing plate is disposed to exhibit maximum transmittance to light transmitted through said polarizing member, and said optical member further comprises a retarder plate provided on a light-transmission side of said absorption type polarizing plate.

7. A liquid-crystal display device comprising a polarizing member defined in any one of claims 1 through 4, wherein said polarizing member is disposed on a surface light source side of a liquid-crystal cell.

8. An optical member comprising: a polarizing member defined in any one of claim 1 through 4; and an absorption type polarizing plate disposed on a surface of said polarizing member opposite to said fine concave-convex structure of said polarizing member, wherein said optical member is disposed on a surface light source side of a liquid-crystal cell.

9. An optical member comprising: a polarizing member defined in any one of claim 1 through 4; and an absorption type polarizing plate disposed on a surface of said polarizing member opposite to said fine concave-convex structure of said polarizing member, wherein said absorption type polarizing plate is disposed to exhibit maximum transmittance to light transmitted through said polarizing member, said optical member further comprises a retarder plate provided on a light-transmission side of said absorption type polarizing plate, and wherein said optical member is disposed on a surface light source side of a liquid-crystal cell.

* * * * *